United States Patent Office 3,305,348
Patented Feb. 21, 1967

3,305,348
HERBICIDAL COMPOSITION AND METHOD EMPLOYING DIAMINO-s-TRIAZINE DERIVATIVES
Werner Schwarze and Hermann Schulz, Frankfurt am Main, Germany, assignors to Deutsche Gold- und Silber-Scheideanstalt vormals Roessler, Frankfurt am Main, Germany
No Drawing. Filed July 31, 1963, Ser. No. 299,066
Claims priority, application Germany, Aug. 1, 1962, D 39,521
6 Claims. (Cl. 71—2.5)

The present invention relates to novel triazine compounds of the formula

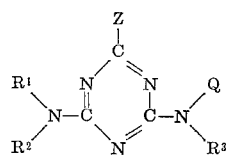

in which $R^1$ and $R^2$ each are hydrogen or lower alkyl, lower alkenyl, lower alkoxy alkyl, $R^3$ is lower alkyl, lower alkenyl or lower alkoxy alkyl, Z is halogen, preferably chlorine, or one of the groups —CN, —CCl$_3$, —CHCl$_2$, —CH$_2$Cl, —SR, —OR, —SO$_3$H, —SO$_3$Me, R being lower alkyl and Me being monovalent metal, such as, an alkali metal, and Q is one of the groups

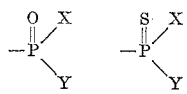

—SO$_2$NR$^4$R$^5$, —SO$_2$R$^6$, —CONR$^4$R$^5$, each of X and Y being halogen, preferably chlorine, or one of the groups OH, OMe′, where Me′ signifies an alkali metal, such as sodium or potassium, or ½ of an alkaline earth metal, such as calcium, —OR$^4$, —NH$_2$, —NHR$^4$ and —NR$^4$R$^5$, each of $R^4$ and $R^5$ being alkyl, preferably lower alkyl, aryl or aralkyl, and $R^6$ being lower alkyl and the use of such compounds for regulating the growth of plants.

The compounds according to the invention can be produced in various ways. The substituent —NR$^1$R$^2$ can be introduced by procedures known per se. Also the methods of providing the halogen, —CCl$_3$, —CHCl$_2$, —CH$_2$Cl, —SR, —OR for substituent Z are well known. The —CN, —SO$_3$H and SO$_3$Me substituents can, for example, be introduced by reacting the quaternary salts of the corresponding triazine derivative with an alkali metal cyanide or bisulfite (with subsequent acidification if SO$_3$H is desired). Such quaternary ammonium salts, for example, can be prepared as described in Austrian Patent No. 174,377. The substituent

can be introduced into the triazine ring in a number of ways depending upon the type of substituent concerned. For example, a chlorinated triazine can be reacted with a diamino sulfone in the presence of an organic solvent and a basic substance at moderate temperatures. Also, for example, the Q substituent can be introduced into an

substituent by treatment with ClCONR$^4$R$^5$ or ClSO$_2$R$^6$ or with POCl$_3$ or PSCl$_3$ followed by reaction with ammonia or a primary or secondary lower amine to replace the chlorine atoms on the phosphorus atom of the compound produced with amino or substituted amino groups.

The chlorine atoms on the phosphorus atom of the compound produced can be replaced with OH or —OMe by reaction with water or aqueous alkali metal or alkaline earth metal hydroxide, or with OR by reaction with an alcohol such as ethyl alcohol or benzyl alcohol or a phenol.

The compounds according to the invention can be used for the extermination or selective suppression of weeds among cultivated plants or also for completely killing and preventing undesirable plant growth. In certain circumstances, they can also be used as plant growth regulating agents, for example, for defoliation, or reducing the amount of fruit which is set or for retarding blossoming. As well as influencing living plants, these compounds can also be used for sterilizing the soil. They can be used as such or in admixture with one another or in admixture with other herbicides or with fungicides, insecticides or fertilizers.

The triazine compounds according to the invention are either solid crystalline substances or oils. Most of them are insoluble or only slightly soluble in water, but, on the other hand, they have good solubility in organic solvents.

The following are examples of solvents for the triazine compounds: alcohols, ketones, hydrocarbons such as toluene, halogenated hydrocarbons such as chloronaphthalene, mineral oils such as diesel oil, vegetable oils or mixtures of the said substances.

The triazine compounds of the invention can be applied by known methods which are familiar to any expert in this field, the choice of the method depending on existing circumstances and the properties of the herbicide. The known formulations can generally be used for this purpose.

For example, more or less concentrated solutions in organic solvents can be prepared and these are further diluted with these solvents prior to use.

The solutions in solvents which are miscible with water can be mixed with water. The triazine compounds then precipitate in solid or liquid form. These suspensions or emulsions can be stabilized by known substances.

The triazine compounds can also be used on solid carriers and as such, all those known for this purpose can be employed, for example, clay, kaolin, kieselguhr, bentonite, talcum, finely ground calcium carbonate, wood charcoal, sawdust and soya bean flour.

The active substances can be mixed in dry form with the carriers. However, solutions or emulsions can also be sprayed on to the carrier or mixed with the latter, the mixture then being dried.

In order to achieve a better adhesion of the active substances to the carriers, known adhesives, "stickers," such as size, casein, alginates and similar substances can be employed.

Finally, the triazine compounds, if desired together with the carrier substances, can be mixed with suspension agents and stabilizers, for example, to form a paste, or processed to give a powder, and these latter can then be stirred with water to form a suspension.

Examples of suitable wetting agents, emulsifiers and stabilizers are known anionic, cationic or non-ionic substances, for example, Turkey red oil, salts of fatty acids, alkyl oxide sulphonates, secondary alkyl sulphates, resinic acid salts, polyoxyethylene ethers of fatty alcohols, fatty acids or fatty amines, quaternary ammonium compounds, lignin-sulphonic acid, saponin, gelatine, casein, by themselves or in admixture with one another.

The herbicidal activity of the triazine compounds according to the invention is exemplified by the following tests carried out with 2-(N-diaminophosphinyl-N-ethyl)-amino - 4-isopropylamino-6-chloro-s-triazine (Compound No. 8535) and 2-(N-diaminophosphinothioyl-N-ethyl)-4-ethyl-amino-6-chloro-s-triazine (Compound No. 8537).

(1) *Pre-emergence soil treatment.*—Various seeds were raked into soil contained in plastic flats kept in a greenhouse maintained at 21° C., watered in the first morning with water and treated in the first afternoon with a dispersion obtained by mixing an acetone solution of the active substance with an equal quantity of water. Thereafter the flats were watered normally and the sprouting observed and two weeks after seeding they were examined to see whether and to what extent the plant growth was suppressed.

(2) *Post-emergence soil treatment.*—The above procedure was followed except that the aqueous dispersion of the active substance was not applied to the soil until after the seeds had sprouted and the examination as to plant growth suppression was two weeks after the sprouting rather than after the seeding.

(3) *Post-emergence foliage treatment.*—The procedure under (2) was repeated except that the aqueous dispersion of the active substance was applied to the foliage of the sprouted plants rather than to the soil.

The results of the tests are given in the following table. The numerical values given signify the quantity of active substance required, expressed in kg. per hectare, to repress 50% of the plant growth. X signifies that the plant growth was not affected.

|  | Pre-emergence soil treatment | | Post-emergence soil treatment | | Post-emergence foliage treatment | |
| --- | --- | --- | --- | --- | --- | --- |
|  | 8535 | 8537 | 8535 | 8537 | 8535 | 8537 |
| Oats | X | X | 1.8 | 2.8 | 1.7 | 4.9 |
| Rye Grass | 3.6 | 6.8 | 1.5 | 1.3 | <1.3 | 2.0 |
| Corn | X | X | X | X | X | X |
| Peas | X | X | 6.0 | X | 7.2 | 9.9 |
| Sugar Beet | <1.0 | 2.7 | <1.1 | 1.1 | <1.3 | <1.3 |
| Flax | 10.0 | X | <1.1 | 1.1 | 1.9 | 1.8 |
| Mustard | <1.0 | 4.8 | <1.1 | 1.1 | <1.3 | <1.3 |

The following examples will serve to illustrate several embodiments of the invention.

EXAMPLE 1

100 g. of 2,4-bis-ethylamino-6-chloro-s-triazine were added to 300 cc. of $POCl_3$ and the mixture boiled for 24 hours under reflux. The reaction mixture was then distilled under vacuum to remove the excess $POCl_3$ and the residue taken up in a mixture of benzene and ligroin. After recovery from such solution 133 g. (84% of theory) of 2-(N-dichlorophosphinyl - N - ethyl)-amino-4-ethylamino-6-chloro-s-triazine were obtained as a white crystalline powder of a melting point of 114–115° C.

*Analysis.*—Calculated for $C_7H_{11}Cl_3N_5OP$: N, 21.9%; Cl, 33.4%; P, 9.7%. Found: N, 21.7%; Cl, 32.6%; P, 9.7%.

EXAMPLE 2

80 g. of 2,4-bis-ethylamino-6-trichloromehyl-s-triazine were added to 300 cc. of $POCl_3$ and the mixture refluxed for 16 hours. The reaction mixture was then boiled down under vacuum and the residue recrystallized from a mixture of benzene and ligroin. 107 g. (95.2% of theory) of 2-(N-dichlorophosphinyl-N-ethyl)-amino-4-ethylamino-6-trichloromethyl-s-triazine were obtained as snow white crystals.

*Analysis.*—Calculated for $C_8H_{11}Cl_5N_5OP$: N, 17.4%; Cl, 44.2%; P, 7.7%. Found: N, 17.1%; Cl, 43.7%; P, 7.7%.

EXAMPLE 3

25 g. of 2-(N-dichlorophosphinyl-N-ethyl)-amino-4-ethylamino-6-chloro-s-triazine were dissolved in 125 cc. of acetone. Then 27 cc. of 25% ammonia were added while stirring at 0° C. The reaction mixture was then poured into ice water and the crystals filtered off on a suction filter. Upon drying 13.3 g. of 2-(N-diaminophosphinyl-N-ethyl)-amino-4-ethylamino-6-chloro-s-triazine were obtained in the form of white crystals which decomposed upon heating over 220° C.

*Analysis.*—Calculated for $C_7H_{15}ClN_7OP$: N, 35.0%; Cl. 12.7%; P, 11.1%. Found: N, 34.7%; Cl, 12.5%; P, 11.3%.

EXAMPLE 4

3.68 g. of Na were dissolved in 100 cc. of methanol and 25.4 g. of 2-(N-dichlorophosphinyl-N-ethyl)-amino-4-ethylamino-6-chloro-s-triazine added to such solution while stirring at 0° C. After 1 hour the resulting solution was of neutral reaction. 14.5 g. (59% of theory) of 2-(N-dimethoxyphosphinyl-N-ethyl)-amino-4 - ethylamino-6-chloro-s-triazine of a melting point of 88–89° C. were recovered therefrom.

EXAMPLE 5

A mixture of 100 g. of 2-ethylamino-4-i-propylamino-6-chloro-s-triazine, 200 cc. of chlorobenzene and 200 cc. of $POCl_3$ was refluxed for 24 hours. Yield: 78 g. (47% of theory) of 2-(N-dichlorophosphinyl-N-ethyl)-amino-4-isopropylamino-6-chloro-s-triazine crystals of a melting point of 101–102° C.

EXAMPLE 6

25 g. of 2-(N-dichlorophosphinyl-N-ethyl)-amino-4-ethylamino-6-chloro-s-triazine were reacted with 38 g. of 40% dimethylamine solution in toluene at 0° C. Yield: 15.1 g. (57% of theory) of 2-(N-dimethylaminophosphinyl-N-ethyl)-amino-4-ethylamino-6-chloro-s - triazine of a melting point of 155–156° C.

EXAMPLE 7

2.3 g. of Na were dissolved in 100 cc. of methanol and 20 g. of 2-(N-dichlorophosphinyl-N-methyl)-amino-4-i-propylamino-6-trichloromethyl-s-triazine added to such solution at −5° C. 2-(dimethoxyphosphinyl-N-methyl)-amino-4-isopropylamino-6-trichloromethyl-s-triazine of a melting point of 158° C. was recovered from such solution.

*Analysis.*—Calculated: N, 17.8%; Cl, 27.1%; P, 7.9%. Found: N, 17.5%; Cl, 27.1%; P, 7.8%.

EXAMPLE 8

14.25 g. of 2-(N-dichlorophosphinyl-N-ethyl)-amino-4-ethylamino-6-trichloromethyl-s-triazine dissolved in 50 cc. of tetrahydrofurane were reacted with 20 cc. of concentrated aqueous ammonia at 0° C. Yield: 9 g. (76.2% of theory) of 2-(N-diaminophosphinyl-N-ethyl)-amino-4-ethylamino-6-trichloromethyl-s-triazine of a melting point of 195° C.

*Analysis.*—Calculated: N, 27.1%; Cl, 29.4%; P, 8.5%. Found: N, 26.7%; Cl, 29.5%; P, 8.1%.

EXAMPLE 9

14.25 g. of 2-(N-dichlorophosphinyl-N-ethyl)-amino-4-ethylamino-6-trichloromethyl-s-triazine were added to 30 g. of a 20% solution of dimethylamine in toluene at 0° C. and the mixture stirred for 2 hours. Yield: 13.3 g. (89.7% of theory) of 2-(N-bis-dimethylaminophosphinyl-N-ethyl)-amino-4-ethylamino-6-trichloromethyl - s - triazine of a melting point of 200° C.

EXAMPLE 10

20.1 g. of 2-(N-dichlorophosphinyl-N-ethyl)-amino-4-ethylamino-6-trichloromethyl-s-triazine were dissolved in 125 cc. of acetone. A suspension of 7.4 g. of $Ca(OH)_2$ in 20 cc. of water were added to such solution over a period of 2 hours at 0° C., the temperature being raised to 20° C. towards the end. The acetone was distilled off under vacuum and the residue treated cold with ethanol. Yield: 15 g. of the calcium salt of 2-(N-dihydroxyphosphinyl-N-ethyl)-amino-4-ethylamino - 6 - trichloromethyl-s-triazine as a light yellow powder.

EXAMPLE 11

100 g. of 2,4-bis-ethylamino-6-chloro-s-triazine in 300 cc. of $PSCl_3$ were refluxed for 24 hours. Yield: 147.5 g. (88% of theory) of 2-(N-dichlorophosphinothioyl-N- ethyl)-amino-4-ethylamino 6-chloro-s-triazine as a brown oil.

EXAMPLE 12

31 g. of 2-(N-dichlorophosphinothioyl-N-ethyl)-amino-4-ethylamino-6-chloro-s-triazine in 100 cc. of acetone was slowly added dropwise at 0° C. into 40 cc. of concentrated ammonia (25%). Yield: 27.1 g. (98% of theory) of 2-(N-diaminophosphinothioyl-N-ethyl) - amino-4-ethyl-amino-6-chloro-s-triazine of a melting point of 115° C. as a yellow powder.

EXAMPLE 13

31 g. of 2-(N-dichlorophosphinothioyl-N-ethyl)-amino-4-ethylamino-6-chloro-s-triazine were dissolved in 100 cc. of acetone. 7.35 g. of aniline were added to such solution at 20° C. and thereafter 9.6 g. of collidine. The temperature rose to 30° C. After 2 hours the reaction mixture was poured into ice water and the precipitate washed chlorine free with water. Yield: 19.5 g. 2-(N-phenyl-amino-hydroxyphosphinyl-N - ethyl) - amino - 4 - ethyl-amino-6-chloro-s-triazine of a melting point of 100° C. as a light yellow powder.

In the following examples the proportions given are in parts or percent by weight.

EXAMPLE 14

A mixture of 10 parts of 2-(N-diaminophosphinyl-N-ethyl)-amino-4-ethylamino-6-chloro-s-triazine, 89 parts of bentonite and 1 part by weight of a finely divided silica aerogel produced aerothermally was ground in a ball mill until it was extremely finely divided. The resulting mixture was usable as such as a dusting powder.

EXAMPLE 15

A mixture of 10 parts of 2-(N-dimethoxyphosphinyl-N-ethyl)-amino-4-ethylamino-6-chloro-s-triazine and 90 parts of kieselguhr was ground in a ball mill to form a dusting powder.

EXAMPLE 16

10 parts of 2-(N-dichlorophosphinyl-N-ethyl)-amino-4-i-propylamino-6-chloro-s-triazine were mixed with 270 parts of very finely divided silica. In order to improve the adherence of such mixture when used as a dusting powder, 1 part by weight of gelatine was added thereto.

EXAMPLE 17

A mixture of 10% of 2-(N-dimethoxyphosphinyl-N-methyl) - amino - 4- i - propylamino - 6 - trichloromethyl-s-triazine, 20% of bentonite, 65% of diatomaceous earth and 5% of dodecyl phenyl polyglycol ether (6 $C_2H_4O$ groups) was ground in a ball mill to a fine powder. The resulting powder is free flowing and easily dispersible in water.

EXAMPLE 18

10 parts of 2-(N-diaminophosphinyl-N-ethyl)-amino-4 - ethylamino - 6 - trichloromethyl-s-triazine were mixed with 290 parts of powdered talcum. The mixture could be used as such a dusting powder but to increase its adherence to foliage 1 part of gelatine was added thereto.

EXAMPLE 19

A mixture of 2-(N-dichlorophosphinothioyl-N-ethyl)-amino-4-ethylamino-6-chloro-s-triazine, 65 parts of xylene and 10 parts of octyl phenyl polyglycol ether (8 $C_2H_4O$ groups) upon addition to water produced stable dispersions.

EXAMPLE 20

10 parts of 2-(N-diaminophosphinothioyl-N-ethyl)-amino-4-ethylamino-6-chloro-triazine were dissolved in a mixture of 10 parts of cyclohexanone, 20 parts of xylene and 10 parts of an ethoxylated fatty alcohol. Upon addition to water stable emulsions are obtained.

EXAMPLE 21

25 parts of 2 - (N-bis-dimethylaminophosphinyl-N-ethyl)-4-ethylamino-6-chloro-s-triazine were mixed with 50 parts of cyclohexanone and 25 parts of octyl phenyl polyglycol ether. Upon mixture with water stable dispersions are obtained.

EXAMPLE 22

10 parts of the calcium salt of 2-(N-dihydroxyphosphinyl-N-ethyl)-amino - 4 - ethylamino - 6 - trichloromethyl-s-triazine were ground together with 90 parts of talc. The resulting powder was usable as such as a dusting powder.

EXAMPLE 23

10 parts of 2-(N-phenylamino-hydroxyphosphinyl-N-ethyl)-amino-4-ethylamino-6-chloro-s-triazine were dissolved in a mixture of 10 parts of cyclohexanone, 20 parts of xylene and 10 parts of ethoxylated fatty alcohol (derived from spermaceti). Upon addition to water stable emulsions are obtained.

EXAMPLE 24

A mixture of 10 parts of 2-(N-carbamoyl-N-i-propyl)-amino-4-i-propylamino-6-cyanotriazine, 89 parts of bentonite and 1 part by weight of very finely divided silica obtained aerothermally was ground to extreme fineness in a ball mill. The resulting mixture can be used as such as a dusting powder.

EXAMPLE 25

10 parts of 2 - (N-carbamoyl-N-i-propyl)-amino-4-i-propylamino-6-sulfotriazine were mixed with 270 parts of extremely finely divided silica obtained in a vapor phase reaction and 1 part of gelatine added thereto to improve the adherence of such powder when employed as a dusting powder.

EXAMPLE 26

A mixture of 10% of 2-(N-dimethylaminosulfonyl-N-ethyl)-amino - 4 - ethylamino-6-cyano-s-triazine, 20% of bentonite, 65% of diatomaceous earth and 5% of dodecyl phenyl polyglycol ether was gound in a ball mill to extreme fineness. The resulting powder is free flowing and can easily be dispersed in water.

EXAMPLE 27

10 parts of 2 - (N-p-chlorophenylaminosulfonyl-N-i-propyl) - amino - 4 - i-propylamino - 6 - cyano-s-triazine and 290 parts of powdered talc were mixed. Such mixture can be used as such as a dusting powder but to improve its adherence to foliage 1 part of gelatine was also incorporated therein.

EXAMPLE 28

A mixture of 25 parts of 2-(N-dimethylaminosulfonyl-N-ethyl)-amino-4-ethylamino-6-sulfo-s-triazine, 65 parts of xylene and 10 parts of dodecyl phenyl polyglycol ether was prepared. This mixture upon addition to water gives stable dispersions.

EXAMPLE 29

A mixture of 25 parts of 2-(N-diaminophosphinyl-N-ethyl)-amino-4-i-propylamino-6-cyano-s-triazine, 50 parts of cyclohexanone and 25 parts of dodecyl phenyl polyglycol ether was prepared. Such mixture upon addition to water gives stable dispersions.

A similarly effective composition was obtained by replacing the active triazine compound with 2-(N-bis-dimethylaminophosphinyl-N-ethyl)-amino - 4 - i - propyl-amino-6-sulfotriazine.

EXAMPLE 30

10 parts of 2-(N-bis-m-chlorophenylaminophosphinyl-N-methyl)-amino - 4 - i - propylamino - 6 - cyanotriazine were ground with 90 parts of talc in a ball mill. The resulting powder can be used as a dusting powder.

We claim:
1. A herbicidal composition comprising as an active ingredient a herbicidally effective amount of a triazine compound of the formula

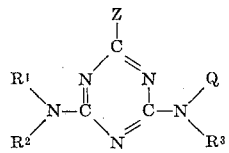

in which each of $R^1$ and $R^2$ is selected from the group consisting of hydrogen, lower alkyl, lower alkenyl and lower alkoxy alkyl, $R^3$ is selected from the group consisting of lower alkyl, lower alkenyl and lower alkoxy alkyl, Z is selected from the group consisting of halogen, —CN, —CCl$_3$, —CHCl$_2$, —CH$_2$Cl, —SR, —OR, —SO$_3$H and SO$_3$Me, R being lower alkyl and Me a monovalent metal, and Q is selected from the group consisting of

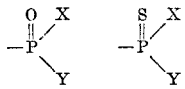

—SO$_2$NR$^4$R$^5$—SO$_2$R$^6$, X and Y each being selected from the group consisting of halogen, —OR$^4$, —NH$_2$, —NHR$^4$, —NR$^4$R$^5$ and —OMe'(1/$n$), each of R$^4$ and R$^5$ being selected from the group consisting of hydrogen, lower alkyl, aryl and aralkyl, R$^6$ being lower alkyl, Me' signifying a metal selected from the group consisting of alkali metals and alkaline earth metals and $n$ signifying the valence of such metals and a major portion of an agricultural adjuvant.

2. A method of inhibiting the growth of plants which comprises contacting at least a part of the plant with a herbicidally effective amount of a triazine compound of the formula

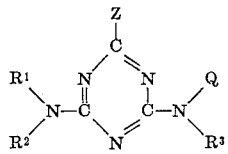

in which each of $R^1$ and $R^2$ is selected from the group consisting of hydrogen, lower alkyl, lower alkenyl and lower alkoxy alkyl, $R^3$ is selected from the group consisting of lower alkyl, lower alkenyl and lower alkoxy alkyl, Z is selected from the group consisting of halogen, —CN, —CCl$_3$, —CHCl$_2$, —CH$_2$Cl, —SR, —OR, —SO$_3$H and SO$_3$Me, R being lower alkyl and Me a monovalent metal, and Q is selected from the group consisting of

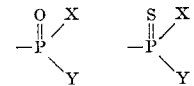

—SO$_2$NR$^4$R$^5$—SO$_2$R$^6$, X and Y each being selected from the group consisting of halogen, —OR$^4$, —NH$_2$, —NHR$^4$, —NR$^4$R$^5$ and —OMe'(1/$n$), each of R$^4$ and R$^5$ being selected from the group consisting of hydrogen, lower alkyl, aryl and aralkyl, R$^6$ being lower alkyl, Me' signifying a metal selected from the group consisting of alkali metals and alkaline earth metals and $n$ signifying the valence of such metals to regulate the growth of the plant.

3. A herbicidal composition comprising a herbicidally effective amount of a triazine compound as described in claim 1 as an active ingredient and a major proportion of an agricultural adjuvant comprising an organic solvent and an emulsifying agent.

4. A herbicidal composition comprising a herbicidally effective amount of a triazine compound as described in claim 1 as an active ingredient and a major proportion of a solid dusting powder agricultural adjuvant.

5. A herbicidal composition comprising a herbicidally effective amount of a triazine compound as described in claim 1 as an active ingredient and a major proportion of an agricultural adjuvant including a sticker.

6. A herbicidal composition comprising an aqueous dispersion of a herbicidally effective amount of a triazine compound as described in claim 1 containing a stabilizer for such dispersion.

References Cited by the Examiner

UNITED STATES PATENTS

| | | | |
|---|---|---|---|
| 2,368,451 | 1/1945 | D'Alelio | 260—249.5 X |
| 2,394,042 | 2/1946 | D'Alelio | 260—249.6 |
| 2,891,855 | 6/1959 | Gysin et al. | 71—2.5 |
| 3,086,855 | 4/1963 | Knusli et al. | 71—2.5 |
| 3,101,335 | 8/1963 | Scott et al. | 260—249.8 |
| 3,103,512 | 9/1963 | Weiberg | 260—249.9 |
| 3,145,208 | 8/1964 | Knusli et al. | 71—2.5 X |
| 3,165,513 | 1/1965 | D'Alelio | 71—2.5 X |

ELBERT L. ROBERTS, *Primary Examiner.*

A. J. ADAMCIK, M. W. WESTERN,
*Assistant Examiners.*